United States Patent [19]

Stridsberg et al.

[11] Patent Number: 4,638,232
[45] Date of Patent: Jan. 20, 1987

[54] METHOD AND APPARATUS FOR CALIBRATING A POSITIONING SYSTEM

[75] Inventors: Lennart Stridsberg, Enskede; Gunnar Rodin, Bromma, both of Sweden

[73] Assignee: Mydata Automation AB, Stockholm, Sweden

[21] Appl. No.: 776,111
[22] PCT Filed: Jan. 18, 1985
[86] PCT No.: PCT/SE85/00021
§ 371 Date: Aug. 30, 1985
§ 102(e) Date: Aug. 30, 1985
[87] PCT Pub. No.: WO85/03368
PCT Pub. Date: Aug. 1, 1985

[30] Foreign Application Priority Data

Jan. 20, 1984 [SE] Sweden ................. 8400287

[51] Int. Cl.$^4$ .............................. G05B 1/06
[52] U.S. Cl. ................... 318/640; 318/568; 318/632
[58] Field of Search ........... 318/568, 632, 640; 364/474

[56] References Cited

U.S. PATENT DOCUMENTS

| | | | |
|---|---|---|---|
| 3,943,359 | 3/1976 | Matsumoto et al. | 318/640 X |
| 3,955,072 | 5/1976 | Johannsmeier | 318/640 X |
| 4,190,889 | 2/1980 | Etoh | 364/474 |
| 4,260,187 | 4/1981 | Frosch | 318/640 X |
| 4,281,385 | 7/1981 | Nakaso et al. | 364/474 |
| 4,562,392 | 12/1985 | Davis et al. | 318/362 X |

Primary Examiner—Benjamin Dobeck
Attorney, Agent, or Firm—Burns, Doane, Swecker & Mathis

[57] ABSTRACT

The invention relates to a method and an apparatus for calibrating a positioning system including a control computer (1405) for producing command value signals to a positioning apparatus which positions an object against a work surface. Sensors (1406,1407) detect the location of the positioning system and convert it to an actual value signal which can be fed back to the control computer. A calibration plane (601) placed on the work surface contains a number of calibration points (602,603), the command value positions of which are entered into the control computer. The positions of at least some calibration points are sensed by a calibration probe (605) corresponding to the object and the actual values for the positions of said points are compared with the command values for the positions of these points on the work surface entered into the control computer. The differences obtained between the actual values and the command values for the positions of the calibration points are stored in the control computer and are used for compensation of the errors of the positioning system by interpolation. The calibration plane preferably consists of a calibration board of electrically insulating material and the calibration probe is an electrically conducting component, the center of which is placed on the calibration board straight above a point, the position of which corresponds to the command value for a calibration point entered into the control unit. The position of the center of the component in one coordinate direction in relation to the calibration point is determined by placing the component in two extreme positions located in the coordinate directions on either side of the calibration point, in which positions the component electrically connects test areas on the calibration board, said areas being connected to detector means and being electrically conducting, whereafter the detected actual value of the position of the calibration point is compared with the command value, entered into the control unit, and any difference that may occur is entered into the control unit as a correction.

3 Claims, 14 Drawing Figures

METHOD AND APPARATUS FOR CALIBRATING A POSITIONING SYSTEM

The invention relates to a method for calibrating a positioning system including a control unit from which command value signals are provided to a positioning apparatus intended to position an object against a work surface, the location of the positioning apparatus being sensed and converted to an actual value signal fed back to the control unit for calibrating the system. The invention also relates to an apparatus for carrying out the method.

Pick-and-place machines, drawing machines, machine tools etc have to fullfill high precision demands and to accomplish this precision with conventional methods puts high demands on the mechanical precision at the manufacture and high constructional stiffness which will cause high manufacturing costs.

The present invention relates to a method for gaining high machine precision without requiring equally high demands on the manufacture of the machine and to an apparatus for carrying out the method by means of a computerized procedure only requiring an insignificant amount of manual work.

The method makes it possible to replace precision with repeatability. As it is considerably less expensive to manufacture repeatable machines than Precision machines, the method implies the possibility of gaining the same operational precision of the machine at a low price. Moreover, in many cases there are other advantages. A machine intended to maintain high precision after long and bumpy transport paths often has to be designed as a stronger, and thus a considerably heavy machine. If the moving parts also are made heavy, powerful motors, power amplifiers and power supplies are required to move the displaceable parts.

However, the economical advantages of the method can easily be obviated if the practical way of carrying out the method is complicated, time-consuming or brings about the risk for erroneous input data. The invention also comprises an apparatus for carrying out the method to low costs and without trained operators when the machine has been erected at the customer's. The apparatus is based on the fact that methods for other purposes have been devised for producing two-dimensional objects cheaply and with high dimensional precision, e.g. printed cards and black and white photographic film. The apparatus utilizes the high precision of such objects which can be easily read by a sensor connected to a control unit. It will then be possible for instance to let a computer program in the control unit, apply the method to the apparatus. In this way the method can be applied rapidly, accurately and without mistakes due to carelessness and with a minimum of human interference. The work of the operator is limited to the erection of the apparatus and possible extra sensors, test of the electrodes etc., starting the program and after completed calibration dismantling of the apparatus etc. and if necessary storing the calibration data.

The method of the invention is characterized by the features defined in claim 1 and consists of of a calibrating procedure, where the actual positions expressed in the coordinates of the working area are measured in a sufficiently large number of points by means of a calibrating device comprising a calibration plane and a calibration probe and are compared with the corresponding coordinates as measured with the position detectors contained in the machine (data from e.g. incremental detectors, calculations based on data sent to step motors or the like). The error differences obtained in this way are stored. When the machine later on is used the measured error differences can be utilized to compensate for the main part of the errors of the machine construction and/or of the sensors by way of interpolation.

The apparatus according to the invention is characterized by the features defined in claim 3 and is thus made that the position which is taken in a sequence of movements typical for the working procedure, can be measured automatically and fed back to a control unit (control computer or the like) of the machine. E.g. in a component mounting machine the position of a calibration component is measured, in a drawing machine the position where a calibration pen or calibration engraving needle is placed, in a machine tool the position where a calibration milling cutter or the like has hit. In those cases when the calibration probe can be easily made electrically conducting, the calibration plane preferably consists of a printed board (presently and most frequently a glass fibre reinforced plastic board on which electrically conducting coatings of copper can be applied with high precision by means of photographical method and can be connected by means of conducting openings through the board). In the printed board test electrodes can be easily installed with conventional techniques, the electrodes then being interconnected by means of conventional methods. In other cases the calibration plane can be made in the form of a film, e.g. when the calibration probe is a photodetector or a laser beam.

The invention will now be described with reference to the accompanying drawings illustrating an actual embodiment of a conventional pick-and-place machine, the purpose of which is to pick pinless electronic components for surface mounting, and to place them on printed boards or substrates.

Figure 5:
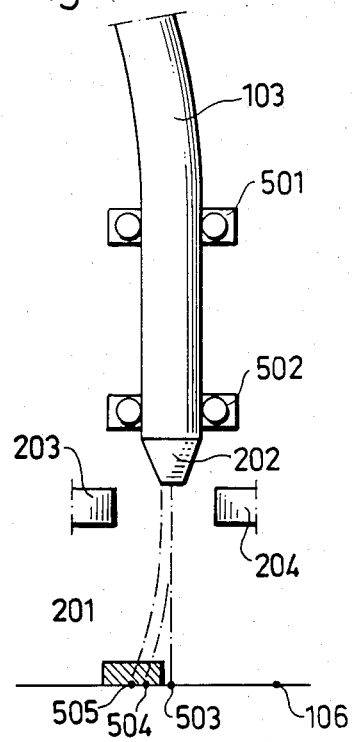
Figure 6:
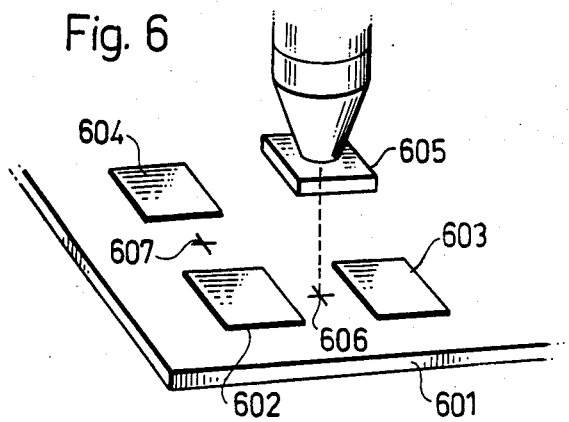
Figure 7:
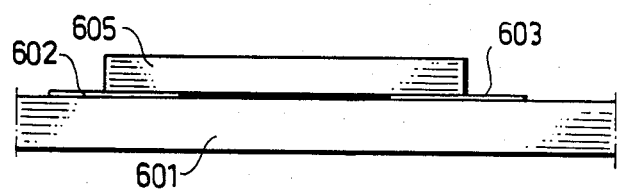
Figure 8:
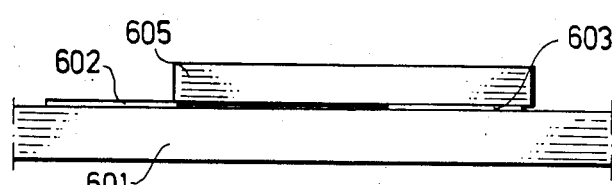
Figure 9:
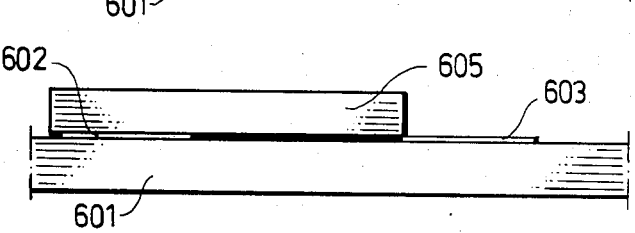
Figure 10:
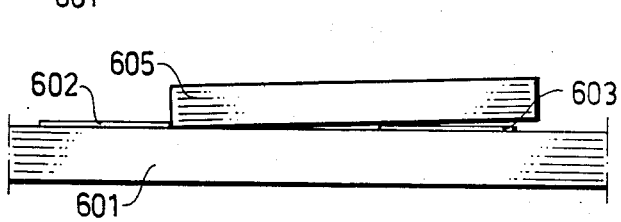
Figure 11:
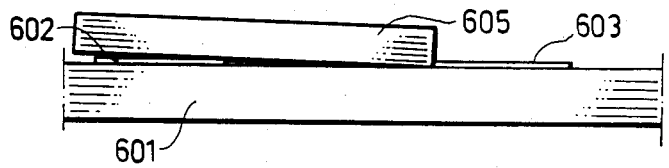
Figure 12:
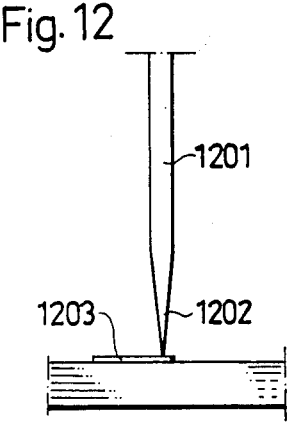
Figure 13:
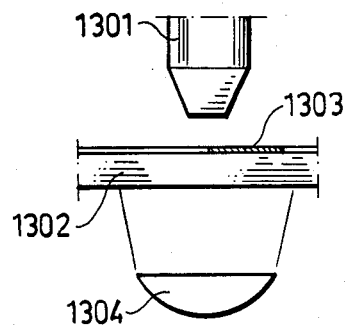
Figure 14:
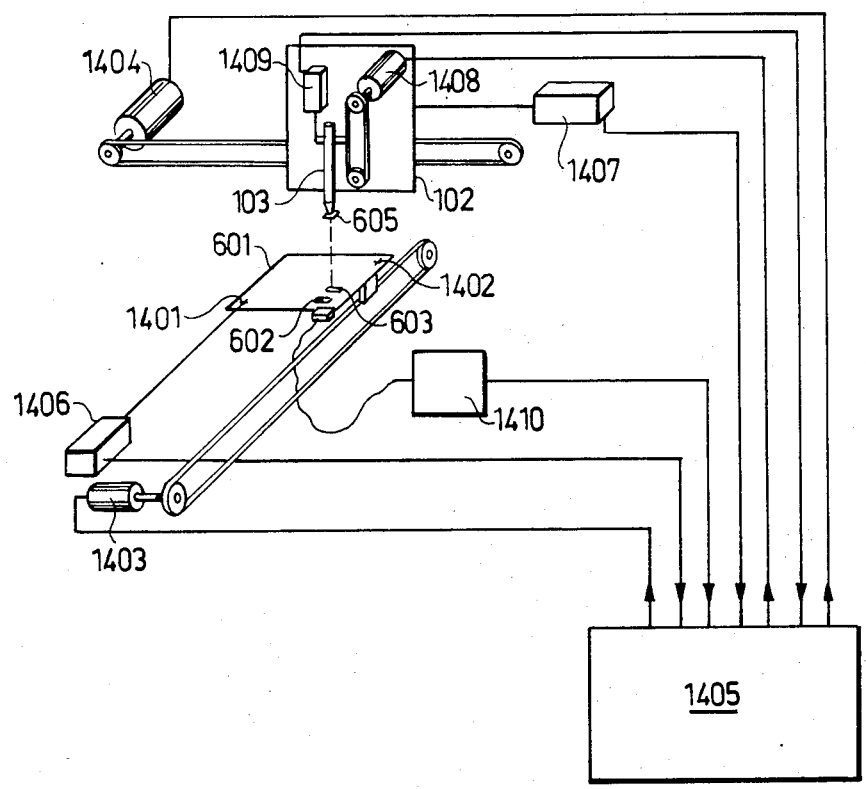

FIG. 5 shows some error sources in the centering and lifting device of the machine, FIG. 6 shows an embodiment of the apparatus according to the invention which is suitable for use in the machine, FIG. 7 shows the position of the electrodes when a calibrating component has been placed centrally over the testing islands (the testing electrodes), FIG. 8 shows the position of the electrodes when a calibrating component has been placed near the limit for contact in one direction, FIG. 9 shows the position of the electrodes when a calibrating component has been placed near the limit for contact in the opposite direction, FIG. 10 shows the position of the electrodes when a calibrating component has been placed near but beyond the limit for contact in said one direction, FIG. 11 shows the position of the electrodes when a calibrating component has been placed near but beyond the limit for contact in said opposite direction, FIG. 12 shows another embodiment of a calibrating probe adapted to a pricking and drawing machine, FIG. 13 shows an embodiment of the invention according to which a photodetector reads a calibrating plane in the form of a photographic film, and FIG. 14 shows a block diagram of the equipment required for carrying out the method according to the invention in the machine.

Figure 1:
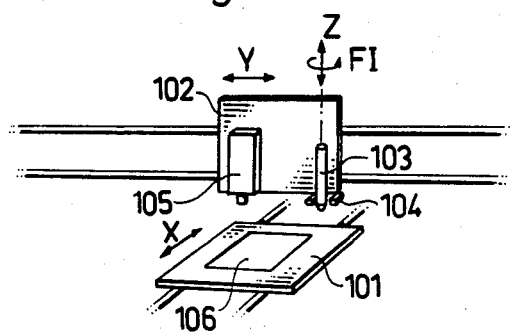
FIG. 1 shows the main parts of the machine.

The construction of the machine is apparent from FIG. 1. A carriage 101 is moveable in the X-direction and a printed board 106 is mounted thereon. Above this carriage another carriage 102 travels in the Y-direction. On this lastmentioned carriage 102 a lifting device 103 is movably arranged in the Z-direction and is rotatable in the FI-direction. On the second carriage 102 a centering device 104 and a television camera 105 are also disposed.

Figure 2:
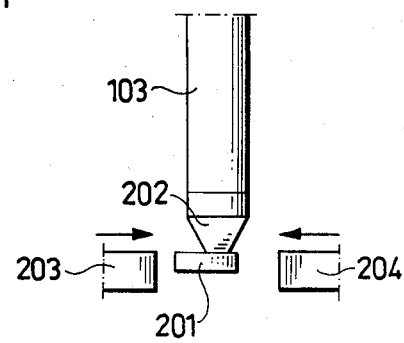
FIG. 2 shows the centering device of the machine.

The function of the centering device 104 is shown more in detail on FIG. 2. The component 201 is lifted by the lifting device 103 by means of a negative pressure and can thus be displaced laterally under the nozzle 202 without falling off. The centering operation is accomplished by means of the laterally moveable heels 203 and 204. They move substantially synchronously, i.e. if the first heel 203 moves 1 mm to the right, the second heel 204 simultaneously will move 1 mm to the left. When the heels 203 and 204 are pressed together against opposite sides of the component 201, the center of the component 201 will be located at the point where the heels would have met if there had been nothing in between them.

The function of the machine is the following (A) to move a component 201 in some way and to place it under the nozzle 202.

(B) to lift the component to sufficient holding height for the heels 203 and 204, (C) to center the component in one direction by pressure the heels 203 and 204 together, (D) to separate the heels 203 and 204 and to rotate the lifting device 103 through an angle of 90° and again press the heels 203 and 204 together, to center the component 201 in the remaining direction, (E) to move the carriage 101 to the correct position for mounting the component 201, (F) to move the carriage 102 to the correct position for mounting the component 201, (G) to rotate the lifting device 103 and give the component 201 the correct setting, and (H) to lower the lifting device 103 and mount the component 201 on the board or the substrate 106.

The television camera 105 is used to determine the location of the board 106 in relation to the coordinate system of the machine by movint the carriages 101 and 102 until the picture in the television camera shows that the camera is located straight above a reference point on the board. When the location of two such reference points have been determined, a computer controlling the machine can readily convert the coordinates of the board/substrate to the coordinates of the machine.

The precision of a conventional machine is influenced by a number of irregularities of the mechanical parts of the machine. A few types of errors of this sort for the machine will be described below.

Figure 3:
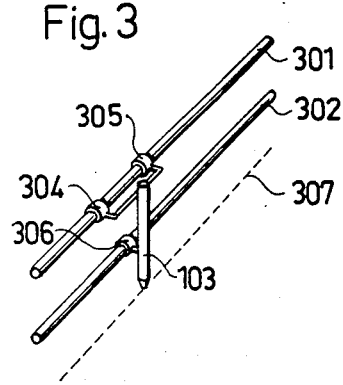
FIG. 3 shows the ideal geometry of the Y-carriage of the machine.

FIG. 3 illustrates the principal construction of the Y-carriage 102. The carriage is guided by two straight rods 301 and 302 and is carried by three linear roller bearings 304, 305 and 306. Since the rods 301 and 302 as well as the lifting device 103 are straight all the points hit by the center of the lifting device will form a straight line.

Figure 4:
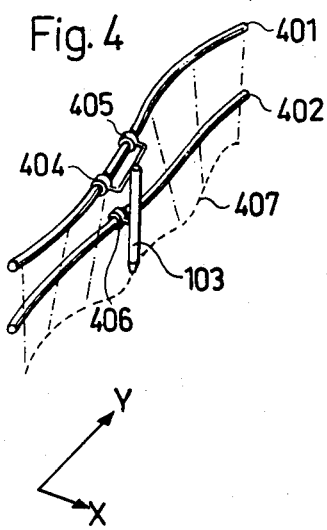
FIG. 4 shows the actual geometry of the Y-carriage of the machine.

FIG. 4 illustrates the properties of an actual construction of the Y-carriage 102. The carriage is guided by two not quite straight rods 401 and 402 and is carried by three linear roller bearings 404, 405 and 406. Since the rods 401 and 402 are not quite straight, all the points hit by the center of the lifting device will form a curved line 407 even if the lifting device is straight and correctly centered.

FIG. 5 illustrates the properties of an actual construction of the lifting and centering device shown in FIG. 2. The lifting device 103 consists of a steel rod that is not straight and is guided by two bearings 501 and 502. Consequently, the center of the nozzle 202, when lowering the lifting device, will not move towards a point 503 located straight below the centering device but towards a point 504. The centering heels 203 and 204 are not perfectly assembled in relation to the center of rotation of the lifting device 103. Thus, the component 201 will not be correctly centered relative to the lifting device 103 and its center 201 will not be placed in the point 504 but in the point 505.

In addition to the errors already described further errors will be added, e.g. due to the fact that the X-carriage is moved along a not quite straight line.

In a conventional machine the position of the component is supposed to be known through the travel of the X-carriage in the the X-direction, the travel of the Y-carriage in the Y-direction and the travel in the Z-direction and the rotation of the lifting device 103. Hereby, errors due to mechanical irregularities are ignored. As is obvious from FIG. 4, the movement of the Y-carriage 102 will also bring about a minor change of the X-coordinate for the hit point on the board 106 of the lifting device.

A practical embodiment of the invention applied to a conventional machine for the mounting of surface mounted components is illustrated in FIG. 6 which shows a calibration plane in the form of a calibration board 601. The board is made of the same material and with the same or higher precision than normally used for those printed boards on which the machine usually mounts components. On the board 601 there are a number of calibration points. On FIG. 6 only one calibration point is illustrated. Every calibration point consists of three test islands 602, 603 and 604. All test islands 602 belonging to all calibration points are connected to each other and to the control computer of the machine. The same applies to all test islands 603 and all test islands 604, respectively.

A calibration probe in the form of a special calibration component 605 belongs to the board 601.

To calibrate the machine in the X-direction in the illustrated testing point the control computer of the machine places the centre of the calibration component 605 at the position, where the the point should be located in accordance with the data available to the control computer. If these data are correct the test islands 602 and 603, as illustrated in FIG. 7, will be connected by the calibration component 605, which can be detected by the control computer of the machine. The calibration component may, for instance, consist of a gilded steel part and the testing electrodes 602, 603 and 604 can also be gilded. The control computer contains the information of the distance between the test islands 602 and 603 and the width of the calibration component 605 and can therefore test to mount the calibration component in two extreme positions with lower and higher X-values than the X-value of the point 606. If the data stored in the control computer regarding the geometry of the machine are correct the calibration component will connect the islands 602 and 603 even in these positions, as shown in FIGS. 8 and 9. If the data are false no contact will be obtained in one of these positions as shown in FIGS. 10 and 11. Since the control computer on every trial can detect if contact is obtained or not, it can systematically be trying until it has found the two limit positions shown in FIGS. 8 and 9 where the calibration component just connects the test islands 602 and 603. Hereby the control computer is able to determine the X-coordinate of the machine corresponding to the point 606 on the calibration board 601.

In a corresponding way the control computer is able to determine the Y-coordinate of the machine corresponding to the point 607 of the calibrating board by placing the calibration component 605 on the point 607 of the calibration board 601.

Since the control computer guided by the apparatus can determine the differences between expected and actual machine coordinates for a sufficient number of points 606 and 607 it can make use of the method described above to compensate for the mechanical irregularities of the machine.

Since the calibrating method and the calibrating apparatus are very closely related to the normal operating sequence and geometry of the machine most repeatable errors influencing the mounting will also influence the calibration, hence it will be possible to compensate for them. The following errors can occur:

errors in the centering device 203-204 will influence the calibration component in the same way as real components of the same size as the calibration component. The calibration may possibly be performed with a number of calibration components of different size.

the fact that the lifting device 103 illustrated in FIG. 5 is not straight creates one type of error, the magnitude of which depends on the distance between the bearing 502 and the board 106. If the calibration board 601 is as thick as a normal board 106 and is clamped in the same fixture the errors will be equal and thus compensated for.

the fact that the lifting device 103 illustrated in FIG. 5 is not straight, also creates another type of error, the magnitude of which depends on the angle FI. Provided that the control computer contains the information of the angle FI, this error can also be compensated for (but requires that the calibration in at least one calibration point is carried out for a sufficient number of different values of FI).

The number of test islands and their geometrical shape can be chosen in a number of different ways and it is of minor importance which one is chosen. In the embodiment illustrated in FIGS. 6–11 the calibration probe is supposed to make contact with two test islands. Alternatively, the test current can pass through the lifting device 103 and every test point can include only one test island, etc.

FIG. 12 illustrates another embodiment of a calibration probe adapted to a pricking and drawing machine. Here the test current passes through a calibration probe shaped as a pricking needle 1202 to a single test island 1203.

FIG. 13 illustrates an embodiment of the invention, where a photodetector 1301 reads a calibration plane in the form of a photographic film 1302 and where the measurement is performed on the edge of a black area 1303, which screens a light beam produced by a light source 1304.

FIG. 14 illustrates means of the machine, used when the machine is about to measure the X-coordinate in the machine coordinate system corresponding to the point 606 in FIG. 6 between the test islands 602 and 603 according to the method described with reference to FIG. 6

The position of the calibration plane (test board) has initially been determined for two reference points 1401 and 1402 on the test board by means of the method described in connection with FIG. 6. Here, a simple transformation between the coordinates of the calibration plane (test board) and the coordinates of the machine can be established as a conventional two-dimensional transformation of the first degree.

To calibrate the machine in the X-direction in the test point as shown the control unit (control computer) 1405 transmits appropriate signals to the motors 1403 and 1404 until the position signals obtained from the sensors 1406 and 1407 indicate, that the test board 601 is in such a position in relation to the calibration component 605 that the test component would be able to contact the test islands in the way shown on FIG. 8. The position derived from the sensors 1406 and 1407 is thus translated by the above mentioned transformation to expected coordinates of the test board.

The control unit 1405 then emits output signals to the motor 1408 to lower the test component 605 to the test board 601. The signals to the motor are generated in relation to the signals obtained from the sensor 1409. If the data stored by the control computer regarding the geometry of the machine are correct, the calibration component will connect the islands 602 and 603 as shown on FIG. 8. The test islands are connected through conductors in the test board to a resistance meter 1410 by means of which the control unit 1405 can determine if contact between the islands 602 and 603 has been established or not.

If the position of the calibration board is correct the measurement can be restricted to one trial in accordance with FIG. 8 and one according to FIG. 9. If contact is established in both cases the position of the point 606 is determined. Otherwise the machine has to make systematical trials, as described above with reference to FIG. 6, until the machine coordinates of the positions shown in FIGS. 8 and 9 have been obtained.

We claim:

1. In a positioning system of the type which includes a positioning device for positioning an object against a work surface, a control unit for controlling said positioning device, and means for sensing the location of the positioning device and providing a signal to said control unit, a method of calibrating the system comprising the steps of:

providing a calibration board made of electrically insulating materal and having a plurality of calibration points and associated electrically conducting test areas at predetermined respective locations on a surface of said board which corresponds to a work surface;

entering the coordinate values of said calibration points into said control unit;

positioning said calibration board with said positioning device so as to bring an electrically conducting calibration component which corresponds to said object against said surface of said board at a location which nominally corresponds to the center of one of said calibration points entered into the control unit;

moving said calibration board and said calibration component relative to one another along a coordinate axis and determining the location of two extreme positions on said axis at respective opposite sides of said one calibration point by detecting test areas associated with said one calibration point;

determining the actual center of said one calibration point from said extreme positions;

comparing the actual center with the value that was entered into said control unit for said calibration point; and storing any difference between the actual and entered values for subsequent use in compensating for errors in the positioning system.

2. A positioning system and apparatus for calibrating the system, comprising:

a calibration board having a plurality of test areas which define calibration points at predetermined locations on said board;

a calibration probe which corresponds to a work object to be positioned on a work surface by the system;

a positioning device for positioning said probe against a surface of said calibration board;

a control computer for controlling the operation of said positioning device to position said probe at the nominal location of one of said calibration points;

means responsive to said probe for detecting test areas and determining the actual location of said calibration point; and compensation means which compares the actual location of a calibration point with its nominal location and stores the difference between said locations for compensating positioning errors in the system.

3. The system of claim 2 wherein said calibration board comprises a photographic film and said calibration probe includes means for determining the transmission of light through said film.

* * * * *